DENNIS P. SHARP.
Improvement in Horse Hay Rakes.

No. 124,225.  
Patented March 5, 1872.

Witnesses:  
F. C. Brecht  
C. Gundry Bennett

Inventor:  
Dennis P. Sharp  
By C. W. Bennett, atty.

UNITED STATES PATENT OFFICE.

DENNIS P. SHARP, OF ITHACA, NEW YORK.

IMPROVEMENT IN HORSE HAY-RAKES.

Specification forming part of Letters Patent No. 124,225, dated March 5, 1872.

SPECIFICATION.

*To all whom it may concern:*

Be it known that I, D. P. SHARP, of the village of Ithaca, in the county of Tompkins and State of New York, have invented a new and useful Improvement in Wheel-Rakes; and I hereby declare the following to be a full and exact description of the same, reference being had to the accompanying sheet of drawing which forms a part of this specification, and in which—

Figure 1:
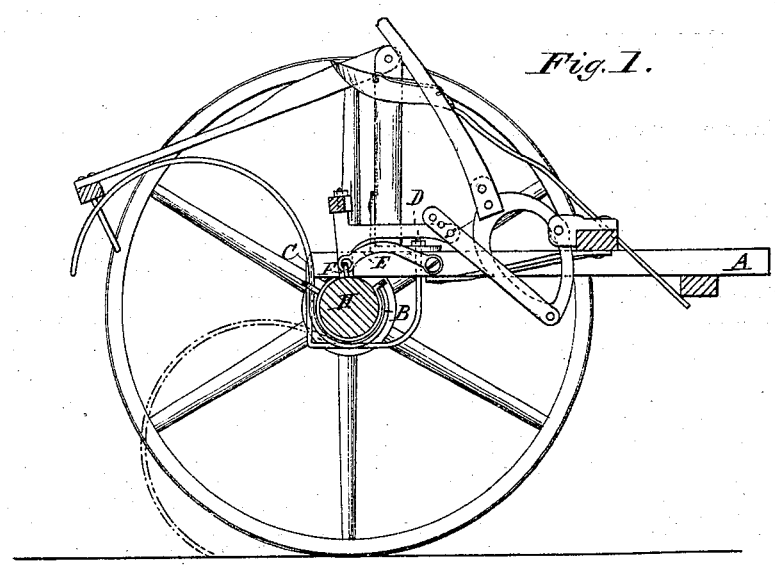
Figure 2:
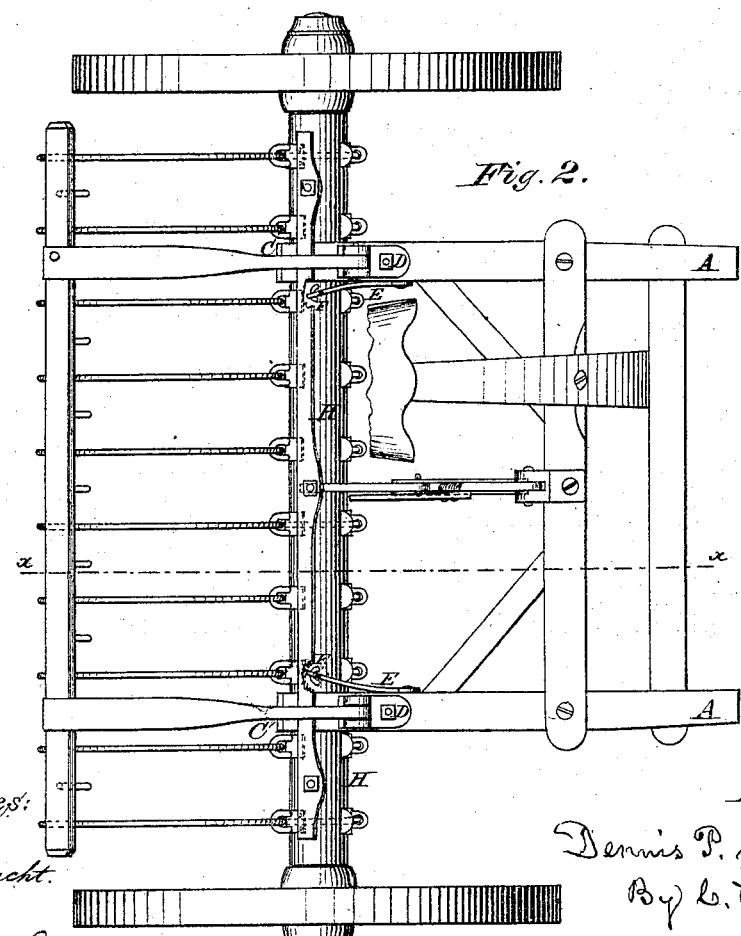

Figure No. 1 is a vertical section on the line *x x*, Fig. 2. Fig. No. 2 is a plan view.

My invention consists of the new and peculiar mode of affixing the shafts to the axle of wheel-rakes.

In the ordinary mode the shafts are fastened to the axle by a loop bolted to the shafts and passing under the axle loosely, leaving the axle to oscillate in loops when dumping or raising the teeth, and by which arrangement a great amount of friction, caused by the weight of the driver and draft of the horse, has to be overcome.

In this invention the shafts are constructed, substantially as shown by A A, projecting over and resting upon the axle, which works freely within a band of iron or other material of desired strength, as shown at B, which band is made fast to the end of the shaft, as shown at C, and running under the axle forming the half of a square or semicircle, the other end of the band being firmly secured to the shaft in front of the axle, as shown at D, and at such distance as to permit the loose hinge or curved bar to work, as hereinafter described. By the peculiar-shaped hinged or curved bar E, which connects the shafts to the axle, one end of said hinge or curved bar being fastened to the axle by a staple-bolt or other equivalent mode, as shown at F, a loose joint is formed at that point, and the other end being fastened on the back side of the axle by a staple or other equivalent device, as shown at G, when the machine is in motion, with the teeth down and filling with hay or straw, the hinge or bar draws directly on the rear of the axle, thus preventing all tendency to draw the teeth up or down; and, as soon as the driver begins to raise the teeth from the ground, the joint of the hinge passes above the center of the axle, causing the draft of the horse to assist in dumping the contents of the rake, and to a great extent making the same self-discharging; and, by the peculiar action of the hinge or bar, friction is prevented, the axle simply rolling under the shafts, while, at the same time, the shafts do not rise from the axle in discharging the load.

By this invention two very important objects are attained—viz., by avoiding all the ordinary friction and wear at the connection of the shafts to the axle, and securing the full draft of the horse in discharging the load.

Having described my invention as above, what I claim, and desire to secure by Letters Patent, is—

The loose hinge or bar E, in combination with the shafts A A, axle H, and band B, constructed and arranged substantially as and for the purpose set forth.

DENNIS P. SHARP.

Witnesses:
JAMES QUIGG,
S. L. VOSBURGH.